United States Patent [19]

Harris et al.

[11] Patent Number: 4,651,043
[45] Date of Patent: Mar. 17, 1987

[54] RESONATOR EXHIBITING UNIFORM MOTIONAL OUTPUT

[75] Inventors: Everett A. Harris, Brookfield Center; John Jugler, Newtown, both of Conn.

[73] Assignee: Branson Ultrasonics Corporation, Danbury, Conn.

[21] Appl. No.: 790,380

[22] Filed: Oct. 23, 1985

[51] Int. Cl.⁴ .......................................... H01L 41/08
[52] U.S. Cl. .................... 310/323; 310/325; 310/326; 51/59 SS; 156/73.3; 425/174.2
[58] Field of Search ............... 310/321, 323, 325, 326, 310/328, 26; 74/155; 51/59 SS, DIG. 11; 156/73.1, 73.3; 239/102; 264/23; 425/174.2

[56] References Cited

U.S. PATENT DOCUMENTS

| 3,113,225 | 12/1963 | Kleesattel et al. | 310/323 X |
| 3,328,610 | 6/1967 | Jacke et al. | 51/59 SS |
| 3,562,041 | 2/1971 | Robertson | 156/73.1 |
| 3,628,071 | 12/1971 | Harris et al. | 310/323 X |
| 3,733,238 | 5/1973 | Long et al. | 156/73.1 X |
| 4,131,505 | 12/1978 | Davis, Jr. | 310/323 X |
| 4,315,181 | 2/1982 | Holze, Jr. | 310/323 |
| 4,363,992 | 12/1982 | Holze, Jr. | 310/323 |
| 4,394,208 | 7/1983 | Wang et al. | 425/174.2 X |
| 4,410,383 | 10/1983 | Lipari | 156/73.3 X |
| 4,414,045 | 11/1983 | Wang et al. | 425/174.2 X |
| 4,426,244 | 1/1984 | Wang | 264/23 X |
| 4,500,372 | 2/1985 | Mion | 156/73.3 |
| 4,529,473 | 7/1985 | Mims | 425/174.2 X |

OTHER PUBLICATIONS

"Ultrasonic Engineering", by Julian R. Frederick, 1965, pp. 87-103.

Primary Examiner—Patrick R. Salce
Assistant Examiner—Emanuel Todd Voeltz
Attorney, Agent, or Firm—Ervin B. Steinberg; Philip J. Feig

[57] ABSTRACT

The invention concerns resonators of rectangular or blade like configuration providing substantially uniform motional output along the output surface. The improvement is achieved by disposing the change in cross-sectional area for producing increased motional amplitude at the output surface in relation to the nodal region of the resonator in such a manner as to cause the lateral portions of the resonator to exhibit a greater motional amplitude gain than that of the central portion.

7 Claims, 3 Drawing Figures

RESONATOR EXHIBITING UNIFORM MOTIONAL OUTPUT

BACKGROUND OF THE INVENTION

This invention relates to resonators, also known as solid horns, concentrators, tools, mechanical amplitude or velocity transformers, which are used to couple mechanical vibrations in the sonic or ultrasonic frequency range from a source of vibrations to a workpiece. Resonators of this type are used extensively in connection with ultrasonic apparatus employed for welding thermoplastic workpieces, for welding metallic workpieces, for ultrasonic drilling, producing emulsions, etc.

Resonators of the type indicated above are metallic sections dimensioned to be resonant as half wavelength resonators when driven at a predetermined frequency of sound travelling longitudinally therethrough from an input end to an oppositely disposed output end. The resonators, depending upon the end use requirements, are made most commonly of aluminum or titanium, less frequently of steel or Monel metal. A rather comprehensive description of the different types of resonators and their design can be found in "Ultrasonic Engineering" (book) by Julian R. Frederick, John Wiley & Sons, Inc., New York, N.Y. (1965), pp. 87-103.

When sealing or bonding superposed layers of textile material by ultrasonic energy, so-called bar resonators are used. Resonators of this type have a rectangular cross-section and, most commonly, include a cross-sectional reduction approximately in the nodal region of the resonator in order to provide increased motional amplitude at the output end when compared with the input end at which the mechanical vibrations are applied. In this manner the resonator, resembling a blade, serves not only to couple vibrations from a source to a workpiece, but also operates as a mechanical amplifier for the vibratory amplitude.

A typical blade-type resonator is shown in U.S. Pat. No. 3,113,225 entitled "Ultrasonic Vibration Generator", issued to C. Kleesattel et al. dated Dec. 3, 1963 and the use of such a resonator in connection with sealing superposed textile material by ultrasonic energy is shown in U.S. Pat. No. 3,733,238 dated May 15, 1973 entitled "Apparatus for Vibration Welding of Sheet Material" issued to D.D. Long et al. A similar ultrasonic sealing arrangement is disclosed in U.S. Pat. No. 3,562,041 issued Feb. 9, 1971 entitled "Method and Apparatus for the Ultrasonic Joining of Materials According to a Pattern" in the name of C.A. Robertson, which patent reveals the manufacture of shirt sleeve cuffs and similar articles.

The problem heretofore encountered is that the frontal surface of these horns, which may have a width from 4 inch (100 mm) to 8 inch (200 mm) or more, exhibits an uneven vibrational amplitude along its width. Most commonly, the vibrational amplitude is of the desired magnitude at the center region of the resonator, but decreases significantly toward the lateral edges. When sealing plastic film and textile materials a relatively high motional amplitude is required, typically 0.003 to 0.005 inch (0.08 to 0.13 mm) peak-to-peak displacement, and since the ultrasonic sealing when operating on soft or flexible material is confined to the area directly underneath the resonator, welding of the material may be satisfactory underneath the center portion of the resonator, but unsatisfactory toward the lateral edges of the resonator.

In the past attempts have been made to design a resonator of rectangular configuration, notably a blade type resonator, which exhibits a substantially uniform motional excursion along the entire output surface. One of the earliest efforts has been the provision of slots which traverse the nodal region of the resonator to thereby break the Poisson coupling, see Kleesattel supra. Further improvements are exemplified by P.H. Davis, U.S. Pat. No. 4,131,505 dated Dec. 26, 1978 entitled "Ultrasonic Horn" and German patent publication Serial No. P 23 43 605 filed Aug. 29, 1973 by Mecasonic S.A.

The Davis patent discloses the use of a peripheral groove in the lower (output) portion of the resonator and applies this groove concept to solid round and rectangular resonators. The Mecasonic patent publication specifically deals with blade-shaped resonators and adds tuned half wavelength resonators at the lateral portions of the resonator in order to obtain substantially uniform motional output along the entire resonator output surface from the central portion to the edges. Assuming a frequency of 20 kHz and material such as aluminum, steel or titanium, a half wavelength resonator is about 5¼ inch (134 mm) long. Hence, considerable weight and height is added to the normally quite heavy resonator by adding two additional half wavelength resonators in a "piggy-back" manner to the input surface of the resonator, see FIG. 4 of the Mecasonic publication.

Another attempt to provide uniform motional output along the width of the output surface of such a horn is shown in U.S. Pat. No. 4,315,181 issued to E. P. Holze, Jr. dated Feb. 9, 1982. The longitudinal slots are angled with respect to each other rather than parallel to each other as disclosed by Kleesattel, et al. supra. This horn, while providing the desired uniform motional output, suffers from high local stress concentration and therefore cannot be used at highest motional amplitude.

A further resonator of blade like configuration with substantially uniform motional amplitude along the entire output surface is shown in U.S. Pat. No. 4,363,992 issued to E. P. Holze, Jr. dated Dec. 14, 1982. In this latter construction, the input surface of the horn is provided with laterally disposed pads for increasing the mass of the resonator at such lateral portions with respect to the central portion of the resonator. This latter construction has been found quite satisfactory, except the provision of the laterally disposed pads, in certain cases, interferes with the attachment of an intermediate resonator which applies vibrations from the source of mechanical vibrations to the input surface of the resonator. This is particularly true, when the intermediate coupling resonator is to be secured to the resonator by welding.

SUMMARY OF THE INVENTION

The present invention concerns resonators of primarily rectangular or blade like configuration providing substantially uniform motional output (vibrational amplitude) along the output surface. The improvement is achieved by disposing the required change in cross-sectional area for producing increased motional amplitude at the output surface in relation to the nodal region or nodal plane of the resonator in such a manner as to cause the lateral portions of the resonator to exhibit a greater motional amplitude gain than the central portion of the resonator. As is well understood in the art, increased motional output is obtained by a reduction in the cross-sectional area of the resonator, and maximum gain is achieved if such reduction in cross-sectional area occurs substantially in the nodal region of the resonator, such nodal region being located substantially medially between the input surface and the output surface of the half wavelength resonator. In the present invention, the resonator provides for the reduction in cross-section to occur substantially in the area of the nodal region for the lateral portions of the resonator, whereas the central portion of the resonator has the reduction in cross-sectional area disposed in the area between the nodal region and the output surface. Tests have shown that by properly selecting the areas of cross-sectional reduction, an average motion uniformly of 97% can be achieved along the width of the output surface.

One of the principal objects of this invention is, therefore, the provision of a generally rectangular resonator exhibiting substantially uniform vibrational amplitude along its entire output surface.

Another important object of this invention is the provision of a blade shaped resonator which is driven by vibratory energy at a central portion of its input surface and which provides substantially uniform amplitude of vibration along its entire output surface.

A further important object of this invention is the provision of a generally rectangular resonator particularly adapted for use in connection with joining plastic film and textile material by ultrasonic energy, the resonator providing substantially uniform motional output along its entire elongated output surface which is in contact with the film or fabric material to be joined.

A still further important object of this invention is the provision of a blade shaped resonator having its gain portions located so that a greater motional amplitude gain is provided in the lateral portions of the resonator than the gain provided in the central portion of the resonator.

Still other and further objects of this invention will become more clearly apparent by reference to the following description when taken in conjunction with the accompanying drawings.

DETAILED DESCRIPTION OF THE INVENTION

Figure 1:
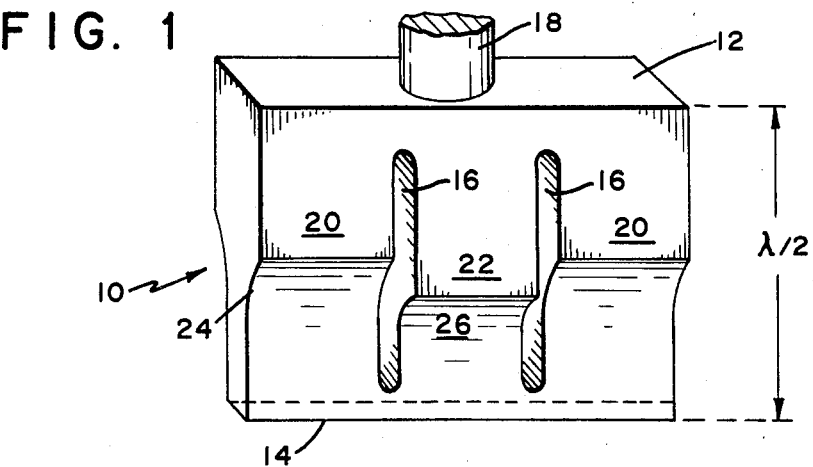
FIG. 1 is a perspective view of a typical resonator in accordance with the present invention.

With reference to the Figures and FIG. 1 in particular, there is shown a blade shaped resonator 10 made of aluminum or titanium metal, having an input surface 12 and an oppositely disposed output surface 14. The resonator is dimensioned to operate as a half wavelength resonator for acoustic energy travelling longitudinally therethrough from the input surface 12 to the output surface 14. When dimensioned for operating at 20 kHz and using aluminum metal, the dimension from the input surface to the output surface is approximately 5¼ inch. The resonator is provided with two longitudinal slots 16 in order to interrupt Poisson couplings as disclosed by Kleesattel et al. supra. The slots extend from a region near the input surface 12 to a region near the output surface 14. Vibrational energy is supplied at a central position of the planar input surface 12 by an intermediate coupling means 18 which receives its vibrational energy from an electroacoustic converter (not shown), such as is shown in U.S. Pat. No. 3,328,610 issued to S. E. Jacke, et al. entitled "Sonic Wave Generator" dated June 27, 1967.

In order to provide increased motional amplitude of vibration at the output surface 14 in relation to the vibratory amplitude present at the input surface 12, the resonator 10 exhibits a change in cross-sectional area from the input surface to the output surface. The ratio of output vibrational amplitude to input amplitude is generally known as the gain. As evident from FIG. 1, the lateral portions 20 of the resonator 10 have their reduction in cross-sectional area occurring substantially at the nodal region of the vibrations transmitted through the resonator, whereas the central portion 22 of the resonator disposed between the slots 16 has the reduction in cross-sectional area occurring in the region between the nodal region and the output surface 14. Maximum gain usually is achieved when the change in cross-sectional area occurs substantially in the nodal region of the resonator, such region being disposed substantially medially between the input surface 12 and output surface 14. While maximum gain occurs when the reduction in cross-sectional area takes the form of a sharp step, sharp corners contribute to localized stress concentration and it is preferred to use a radius for obtaining a more gradual change in cross-sectional area. As seen in FIG. 1, the lateral portions 20 are provided with a concavely curved surface 24 to obtain a reduced cross-sectional area, and the central portion 22 is provided with a similarly curved portion 26 to achieve the same reduction in cross-sectional area from the input surface to the output surface. But, as previously noted, these cross-sectional reductions are not disposed in the same plane in relation to the nodal region of the resonator as has been the practice in the prior art. The resonator construction as shown in FIG. 1 is such that the lateral portions 20 exhibit a higher motional gain than the central portion 22 for achieving substantially uniform motional output along the entire width of the output surface 14. Finite element analysis may be used for calculating the respective displacement amplitudes, see "The Design of Ultrasonic Resonators With Wide Output Cross-Sections" by P. L. L. M. Derks, dissertation at Technische Hogeschool Eindhoven, The Netherlands, 1984.

Figure 2:
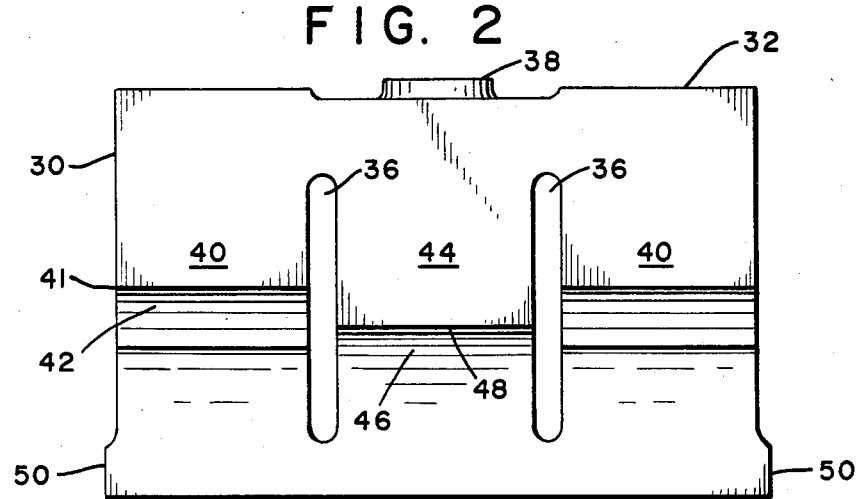
FIG. 2 is an elevational front view of another embodiment of the present invention.
Figure 3:
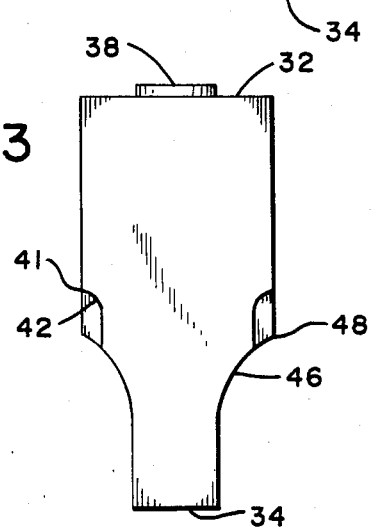
FIG. 3 is an elevational side view of the embodiment shown in FIG. 2.

FIGS. 2 and 3 disclose a similar resonator 30 exhibiting an input surface 32 and an oppositely disposed output surface 34. A pair of longitudinal slots 36 are disposed for breaking Poisson couplings as stated previously. A source of vibrational energy is applied to the resonator by coupling a source of vibrational energy to a pad 38 disposed centrally along the input surface 32. The lateral resonator portions 40 have the reduction in cross-sectional area occurring by a curved surface 42 starting at the area 41 substantially at the nodal region of the resonator, whereas the central portion 44 has such reduction in cross-sectional area occurring by means of a curved surface 46 starting at a area 48 which is located between the nodal region and the output surface 34. The resonator is provided at either side with slightly protruding ears 50, which configuration has been found to stabilize the vibrational excursion of the edge of the resonator.

While there has been described and illustrated a certain preferred embodiment of the present invention, it will be apparent to those skilled in the art that various changes and modifications may be made therein without departing from the broad principle of the invention which shall be limited only by the scope of the appended claims.

What is claimed is:

1. A blade shaped ultrasonic resonator dimensioned to be resonant as a half wavelength resonator for vibrational energy of predetermined ultrasonic frequency applied at a central location along an input surface of said resonator and travelling longitudinally therethrough from said input surface to an oppositely disposed output surface whereby to cause said input surface and said output surface to be disposed substantially at antinodal regions of such vibrational energy with a nodal region disposed substantially medially between said input and output surfaces, said resonator having a central longitudinal portion and two lateral longitudinal portions, said central portion and each of said lateral portions including a change in cross-sectional area for providing at said output surface increased motional amplitude of the vibrational energy applied at said input surface, the improvement comprising:

said change in cross-sectional area being disposed in said respective portions in relation to said nodal region for causing said lateral portions to exhibit a greater motional amplitude gain than said central portion whereby to provide substantially uniform motional amplitude along said output surface.

2. A blade shaped ultrasonic resonator as set forth in claim 1, said resonator including a pair of laterally spaced longitudinal slots extending generally from a region near said input surface through said nodal region to a region near said output surface for interrupting Poisson couplings, said central portion being defined by the resonator portion disposed between said slots.

3. A blade shaped ultrasonic resonator as set forth in claim 2, said change in cross-sectional area comprising a reduction in cross-sectional area from said input surface to said output surface, and said change in cross-sectional area occurring substantially in the nodal region of said lateral portions and occurring at a location between said nodal region and said output surface of said central portion.

4. A blade shaped ultrasonic resonator as set forth in claim 3, said change in cross-sectional area comprising a curved portion.

5. A blade shaped ultrasonic resonator as set forth in claim 2, said input surface comprising a substantially planar surface.

6. A blade shaped ultrasonic resonator dimensioned to be resonant as a half wavelength resonator for vibrational energy of predetermined ultrasonic frequency applied at a central location along an input surface of said resonator and travelling longitudinally therethrough from said input surface to an oppositely disposed output surface whereby to cause said input surface and said output surface to be disposed substantially at antinodal regions of such vibrational energy with a nodal region disposed substantially medially between said input and output surfaces, said resonator having a central longitudinal portion and two lateral longitudinal portions, said central portion and each of said lateral portions including a change in cross-sectional area for providing at said output surface increased motional amplitude of the vibrational energy applied to said input surface, the improvement comprising:

said change in cross-sectional area of said lateral portions being offset with respect to said change in cross-sectional area of said central portion as related to the nodal region of said resonator.

7. A blade shaped ultrasonic resonator as set forth in claim 6, said resonator including a pair of laterally spaced longitudinal slots extending generally from a region near said input surface through said nodal region to a region near said output surface for interrupting Poisson couplings, said central portion being defined by the resonator portion disposed between said slots.

* * * * *